Patented Nov. 1, 1949

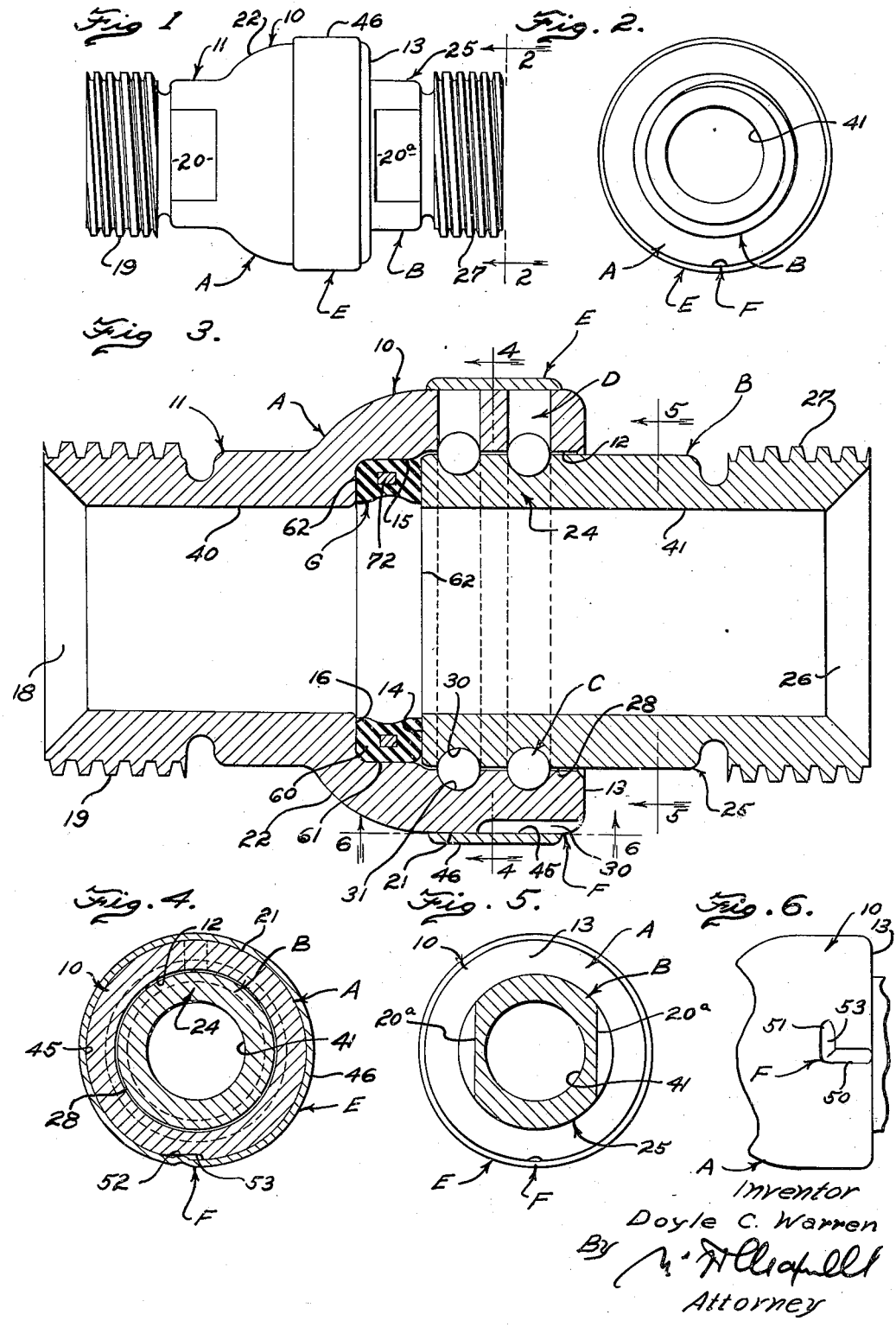

2,486,451

UNITED STATES PATENT OFFICE 2,486,451

SANITARY SWIVEL COUPLING

Doyle C. Warren, Monrovia, Calif., assignor to Chiksan Company, Brea, Calif., a corporation of California Application April 14, 1947, Serial No. 741,249

8 Claims. (Cl. 285—97.3)

This invention has to do with a sanitary swivel coupling, it being a general object of the invention to provide a quick detachable fluid handling coupling that is simple and inexpensive of manufacture and which will handle fluids without causing contamination thereof. There are many situations where fluids are handled as for instance conducted from one point to another and where it is vitally important that the fluids be so handled without exposing them to the danger of contamination. Such a situation is where foods or beverages are being handled, for example where milk or dairy products are being handled. In the case of milk or dairy products equipment employed for conducting such materials must be free of pockets or interstices that may serve to catch or hold materials that may become fouled in any way, and such equipment must be such that it can be readily dismantled and when dismantled may be thoroughly cleaned or sterilized before being reassembled.

A general object of the present invention is to provide a structure of the general character referred to which will serve to adequately handle fluids such as liquid foods or beverages and which meets in every way the various standards of sanitation required for safe handling of foods or beverages.

Another object of the present invention is to provide a swivel coupling of the general character referred to which can be easily and quickly assembled or taken apart. The structure that I have provided when apart involves few simple unitary or integral elements that are simple and convenient to handle, and which are such that they can be readily and thoroughly cleaned and sterilized.

Another object of this invention is to provide a construction of the general character referred to wherein the various parts are simple in form and construction and are such that their various surfaces may be smooth and free of pockets or interstices, the construction being such that all parts may be readily finished and polished so that the surfaces presented have little tendency to hold or collect foreign matter and are such that they can be readily wiped clean.

It is another object of the present invention to provide a swivel connection for a fluid conduit which is entirely free of screw threads or like fine parts or structural features, the only threads involved in the structure being coarse exposed threads at the ends of the structure to facilitate coupling with other fittings or equipment.

It is a further object of the present invention to provide a structure of the general character referred to employing a retaining ring or sleeve that prevents displacement of the balls employed to couple the present sections of the structure which retainer is of simple, plain design and is entirely free of screw threads or like structural features likely to catch or hold materials of any kind.

Another object of the present invention is to provide a structure of the general character referred to wherein there is a simple annular packing ring serving as the sole packing element in the structure, which ring is carried in a channel established between the sections of the structure so that it is of simple U-shaped cross sectional configuration free of lips, overhanging parts, or obstructions subject to catching or holding material of any kind.

Another object of the invention is to provide a packing ring for a structure of the general character referred to which ring is formed of an annular body of deformable or resilient packing material stiffened or reinforced by a metallic ring so that the packing material is positively held in place, making it impossible for any portion thereof to become dislodged to enter the materials being handled by the structure.

The various objects and features of my invention will be fully understood from the following detailed description of a typical preferred form and application of the invention, throughout which description reference is made to the accompanying drawings, in which:

Fig. 1 is a side elevation of the swivel joint construction provided by the present invention. Fig. 2 is an end view of the structure, being a view taken as indicated by line 2—2 on Fig. 1. Fig. 3 is an enlarged longitudinal detailed sectional view of the structure provided by the present invention. Fig. 4 is a reduced transverse sectional view of the structure taken as indicated by line 4—4 on Fig. 3. Fig. 5 is a reduced transverse sectional view taken as indicated by line 5—5 on Fig. 3, and Fig. 6 is a view illustrating a portion of the body of the socket section with the retaining ring removed to show the bayonet slot employed in releasably securing the retaining ring on the body section.

The construction of the present invention involves, generally, two main sections one a socket section A and the other a pin section B, the pin section having an inner or pin end entered in the socket provided in the body of the socket section. One or more annular series of balls C couple the sections A and B together, retaining the pin end of the pin section within the socket of the socket section. An access opening D is provided in the body of the socket section to admit the balls to each series and a retainer E is applied to or carried on the body of the socket section to prevent escape or displacement of the balls C. Releasable retaining means F is provided coupling the retainer E and the socket section A so the retainer remains in operating position on the body section during normal usage of the structure. The body and pin sections cooperate to form an open channel carrying a packing ring G.

The socket section A includes, generally, a body 10 and a neck portion 11 which parts are joined end to end forming a straight tubular unit or assembly as clearly illustrated in Fig. 3 of the drawings. The body portion of the socket section is somewhat larger in diameter than the neck portion 11 and a bore or socket 12 is provided in the body 10 being formed in the body from its outer end. The bore or socket 12 enters the body 10 from its outer end 13 far enough to receive a substantial portion of the pin section and inward of the inner end 14 of the pin section the socket has an extension or counterbore 15 of somewhat reduced diameter which accommodates the packing ring G. The counterbore 15 forms the bottom of the packing carrying channel while the bottom 16 of the socket or combined bore 12 and counterbore 15 provided in body 10 forms one of the side walls of the packing carrying channel, the end 14 of the particular section B forming the other wall of such channel.

The neck portion 11 of the socket section A is preferably a simple tubular extension projecting from the body 10 and in practice it is ordinarily formed with structural features for cooperative engagement with other elements such as other fittings or parts. In the case illustrated I have shown the outer end of the neck 11 provided with a finished seat 18 and I have shown the exterior of the neck provided with a coarse thread 19. Further, in practice it is desirable to provide suitable tool seats or flats 20 on the exterior of the neck 11 for the reception of a wrench or the like.

It is to be observed that the body section A that I have provided is exceedingly simple in form and construction. In practice the outer surface 21 of the body portion 10 may be a plain turned or round surface that can be readily finished and a suitably curved surface 22 joins the body 10 with the neck 11. Where other features or portions of the body connect the corners are preferably rounded or dressed to eliminate sharp corners or pockets, making the body such that it can be readily finished to be smooth and free of parts subject to catching or holding material of any kind.

The pin section B of the structure may be a simple tubular element with an inner end or pin portion 24 and an outer or neck portion 25. The neck portion may be fashioned or finished in any suitable manner. For instance, it may have a tapered seat 26 similar to the seat 18 and it may be provided with an external thread 27 similar to the thread 19, and further it may have flattened parts 20ª similar to the flats 20 of the socket section A. The pin portion 24 terminates in the flat shoulder 14 forming one side of the packing carrying channel and it has a round or turned exterior 28 of such size as to fit the bore 12 with suitable working clearance.

In accordance with my invention balls are employed to couple the sections A and B, that is to retain the pin portion 24 in the socket 12. The balls are arranged in series and in practice one or more series may be employed as desired. In the case illustrated I have shown two annular series of balls carried in registering grooves of the sections A and B there being inner grooves 30 in the exterior 28 of the pin portion 24 and outer grooves 31 in the wall of the bore 12 which forms the socket that receives the pin portion 24. The grooves 30 and 31 are substantially half-round in form so that when the grooves are in register they form a round ball-carrying passage.

In accordance with my invention an access opening D is provided or formed radially in the body portion 10 to extend from the exterior 21 of the body portion to a groove 31 in the socket, there being one access opening D for each series of balls C employed in the structure. A feature of my present invention is the formation of the openings D so that they are simple, straight, smooth-walled bores entirely free of shoulders, threads or other physical characteristics that might cause them to catch or retain material of any kind. Since the structure that I have provided is designed as a swivel connection or coupling in a fluid conduit the sections A and B are provided with fluid passages 40 and 41, respectively, preferably round, smooth-walled openings or passages which may correspond in size and which are separated only by the packing ring G which is located in the channel that occurs between the bottom 16 of socket 12 and the end 14 of pin section B. It will be apparent that the surfaces or walls of the passages 40 and 41 are such that they can be readily finished or polished and it will also be apparent that the pin section B is of such simple plain design that it may be readily finished or polished throughout, so that it presents no pockets or structural features that will catch or retain material of any kind.

The retaining means or retainer ring E serves as a closure for the access openings D and in the preferred form of the invention it is a simple ring slidably carried on the exterior 21 of the body 10 and is made of sufficient axial extent to overlie both access openings D, as clearly shown in Fig. 3 of the drawings. The retainer ring has a smooth inner surface 45 finished to slidably fit the exterior of the body and has a smooth finished exterior 46. Since the ring E must serve only to retain the balls so that they do not escape from the access openings the ring may be comparatively thin so that it does not materially add to the bulk or size of the structure.

The means F provided for releasably retaining the ring E on the body 10 is preferably a bayonet slot construction and in its preferred form it involves a bayonet slot formed in the exterior of the body 10 which slot has a longitudinal portion 50 and a lateral or circumferential portion 51. A lug 52 projects inwardly from the ring to extend into and cooperate with the bayonet slot. The lug 52 may be provided or formed on the ring in any suitable manner. For instance it may be formed by dimpling or inwardly depressing the ring as clearly illustrated in Fig. 4 of the drawings. The longitudinal or axially disposed portion 50 of the bayonet slot extends to and opens at the outer end 13 of the body 10 and forms a passage through which the lug 52 passes as the retainer ring E is moved axially into and out of the proper position lengthwise of the body 10. The lateral or circumferential portion 51 of the bayonet slot accommodates the lug 52 and preferably holds the lug so the ring is retained against displacement from the body. I prefer to provide the portion 51 of the bayonet slot with a wedge surface so that a wedging action is obtained between the lug and the body on which the ring E is engaged. In the preferred construction, as shown in the drawings, the bottom 53 of slot portion 51 is made inclined or is wedge shaped so that the lug is tightly engaged with the body as the ring E is rotated in a manner to move the lug 52 from the slot portion 50 into the slot portion 51.

The packing ring G is preferably a continuous annular body of packing material 60 preferably a resilient or conformable material which, in practice, will vary in character depending upon the material being handled by the structure. Ordinarily pure rubber or rubber-like composition is practical for most materials and rubber or rubber-like material forms an effective packing material to act between the sections A and B. The body of packing is preferably substantially rectangular in cross sectional configuration and has an outer surface 61 that seats in the counter-bore 15 and flat end surfaces 62 that seat on the shoulder 16 and end 14 as clearly shown in Fig. 3 of the drawings. In accordance with my invention a stiffening or reinforcing ring 72 preferably of metal is embedded within the body 60 of packing material and serves to positively prevent displacement of the packing ring from the channel formed by the sections A and B, as hereinabove described.

From the foregoing description it will be apparent that I have provided an exceedingly simple, practical compact swivel connection involving few parts all of which are such that they are free of corners, interstices, or structural features likely to catch or hold materials of any kind, either the materials being handled by the device or foreign materials that may contact it. Each element of the structure is such that it may be readily finished to be smooth and may be easily polished. It is to be understood, of course, that the various elements of the structure may be made of any suitable material and I may mention that for most uses it is advantageous to form the various parts of the structure of stainless steel.

With the construction I have provided it is a simple matter to insert the pin portion 24 of section B into the socket 12 and then introduce the balls C through the access openings D. When the balls are in place the retainer ring E is arranged in position by manipulating it relative to the body 10 so that lug 52 passes inward through slot portion 50 and then wedges in the slot portion 51. When the parts are thus assembled the balls effectively retain the pin portion 24 in socket 12 and the sections A and B are effectively coupled for relative rotation. It is to be understood that before introducing pin portion 24 into the socket the ring G is introduced into the counterbore so that it seals between the sections A and B when the sections are retained together by the balls C. The reinforcing ring 62 in the packing ring positively prevents displacement of the packing ring.

When it is desired to clean the structure it is a simple matter to disengage the retaining ring E and remove the balls C through the access openings D whereupon the pin section can be separated from the body section and the packing ring G removed from the counterbore. When the parts are separated they are easily handled and all of their surfaces are readily accessible for cleaning.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A swivel joint of the character described including, two tubular sections, one a socket section with a neck portion and an enlarged body having a socket in it from its outer end and the other a pin section with an inner end portion engaged in the socket, there being registering grooves in the opposed walls of the bore and said portion of the pin section, balls in the grooves, there being a smooth walled access opening in the body passing the balls to and from the grooves, a retainer ring confined to and slidably carried on the exterior of the body closing the opening, and means releasably retaining the ring on the body.

2. A swivel joint of the character described including, two tubular sections, one a socket section with a body having a socket in it from its outer end and the other a pin section with an inner end portion engaged in the socket, there being registering grooves in the opposed walls of the bore and said portion of the pin section, balls in the grooves, there being a smooth walled access opening in the body passing the balls to and from the grooves, a retainer ring slidably carried on the exterior of the body closing the opening, and means releasably coupling the ring and body including a lug on the ring cooperating with a bayonet slot in the body, one end of the bayonet slot being open.

3. A swivel joint of the character described including, two tubular sections, one a socket section with a projecting neck and an enlarged turned body having a central socket in it from its outer end and the other a pin section with an inner end portion engaged in the socket, there being registering grooves in the opposed walls of the bore and said portion of the pin section, balls in the grooves, there being a smooth walled access opening in the body passing the balls to and from the grooves, a retainer ring of uniform size throughout its length slidably carried on the exterior of the body and closing the opening, and means releasably coupling the ring to the body including a lug on the ring cooperating with a bayonet slot in the body, one end of the bayonet slot being open.

4. A swivel joint of the character described including, two tubular sections, one a socket section with a body having a socket in it from its outer end and the other a pin section with an inner end portion engaged in the socket, there being registering grooves in the opposed walls of the bore and said portion of the pin section, balls in the grooves, there being a smooth walled access opening in the body passing the balls to and from the grooves, a retainer ring of uniform size slidably carried on the exterior of the body closing the opening, and means releasably coupling the ring to the body including an inwardly projecting lug on the ring cooperating with a bayonet slot in the exterior of the body, the slot having a circumferentially extending inner lug receiving portion with an inclined wall against which the lug wedges.

5. A swivel joint of the character described including, two tubular sections, one a socket section with a neck portion and an enlarged body portion adjoining the neck portion, the sole thread of the socket section being on the exterior of the neck portion, the other section being a pin section with a neck portion and a pin portion adjoining the neck portion, the sole thread of the pin section being on the exterior of the neck portion, the exteriors of both sections being smooth and round except where said threads occur, the pin portion being engaged in a socket in the body portion, balls in registering grooves in the socket and pin portions, there being a smooth walled access opening in the body portion passing the balls to and from the grooves, and a plain smooth ring of uniform size slidably engaged on the body portion overlying the access opening.

6. A swivel joint of the character described including, two tubular sections, one a socket section with a neck portion and an enlarged body portion adjoining the neck portion, the sole thread of the socket section being on the exterior of the neck portion, the other section being a pin section with a neck portion and a pin portion adjoining the neck portion, the sole thread of the pin section being on the exterior of the neck portion, the exteriors of both sections except where the said threads occur being smooth and round, the pin portion being engaged in a socket in the body portion, balls in registering grooves in the socket and pin portions, there being a smooth walled access opening in the body portion passing the balls to and from the grooves, a plain smooth uniform ring slidably engaged on the body portion overlying the access opening, and means releasably coupling the ring and body including a lug on the ring cooperating with a bayonet slot in the body, one end of the slot being open.

7. A swivel joint of the character described including, two tubular sections, one a socket section with a neck portion and an enlarged body portion adjoining the neck portion, the sole thread of the socket section being on the exterior of the neck portion, the other section being a pin section with a neck portion and a pin portion adjoining the neck portion, the sole thread of the pin section being on the exterior of the neck portion, the exteriors of both sections being smooth and round, the pin portion being engaged in a socket in the body portion, balls in registering grooves in the socket and pin portions, there being a smooth walled access opening in the body portion passing the balls to and from the grooves, a plain smooth ring slidably engaged on the body portion overlying the access opening, means including a cooperating lug and slot releasably retaining the ring on the body, the sections cooperating to define an inwardly opening channel between the inner end of the pin portion and the bottom of the socket, the channel having a substantially flat bottom and substantially flat opposed side walls and a reinforced packing ring in the channel, the internal diameter of the packing ring being substantially the same as that of the tubular sections.

8. A swivel joint of the character described including, two tubular sections having straight uniform flow openings of equal diameter, one a socket section with a neck portion and an enlarged body portion adjoining the neck portion, the sole thread of the socket section being on the exterior of the neck portion, the other section being a pin section with a neck portion and a pin portion adjoining the neck portion, the sole thread of the pin section being on the exterior of the neck portion, the exteriors of both sections being smooth and round except where said threads occur, the pin portion being engaged in a socket in the body portion, balls in registering grooves in the socket and pin portions, there being a smooth walled access opening in the body portion passing the balls to and from the grooves, a plain smooth ring of uniform size slidably engaged on the body portion overlying the access opening, the sections cooperating to define an inwardly opening channel between the inner end of the pin portion and the bottom of the socket, the channel having flat opposed side walls, a reinforced packing ring in the channel, the internal diameter of the packing ring being substantially the same as that of the flow openings in said sections, and means releasably coupling the first mentioned ring and the body including a lug on said first mentioned ring and a bayonet slot in the exterior of the body, the slot being open at one end and having an inner inclined portion against which the lug wedges.

DOYLE C. WARREN.

REFERENCES CITED

The following references are of record in the file of this patent:

UNITED STATES PATENTS

| Number | Name | Date |
|---|---|---|
| 1,371,882 | Ferguson et al. | Mar. 15, 1921 |
| 1,879,364 | Lomar | Sept. 27, 1932 |
| 1,961,583 | Hamer | June 5, 1934 |
| 2,382,375 | Allen et al. | Aug. 14, 1945 |